United States Patent [19]
Gerard

[11] Patent Number: 6,077,925
[45] Date of Patent: Jun. 20, 2000

[54] STRUCTURAL ADHESIVES

[75] Inventor: Eric-Jack Gerard, Louvain-la-Neuve, Belgium

[73] Assignee: Shell Oil Company, Houston, Tex.

[21] Appl. No.: 09/139,696

[22] Filed: Aug. 25, 1998

[30] Foreign Application Priority Data

Aug. 26, 1997 [EP] European Pat. Off. .............. 97306483

[51] Int. Cl.⁷ .................................... C08G 18/10
[52] U.S. Cl. ................ 528/60; 528/65; 528/75; 528/85; 528/905; 525/127; 525/130
[58] Field of Search ............... 528/75, 85, 905, 528/60, 65; 525/127, 130

[56] References Cited

U.S. PATENT DOCUMENTS

| | | | |
|---|---|---|---|
| 3,437,622 | 4/1969 | Dahl | 260/24 |
| 4,820,368 | 4/1989 | Markevka et al. | 156/307.3 |
| 5,393,843 | 2/1995 | Handlin, Jr. et al. | 525/386 |

FOREIGN PATENT DOCUMENTS

| | | | |
|---|---|---|---|
| 0504436 A1 | 9/1992 | European Pat. Off. | C08G 18/10 |
| 0522658 A1 | 1/1993 | European Pat. Off. | C08G 18/62 |
| 0709416 A2 | 5/1996 | European Pat. Off. | C08G 18/62 |
| 97/00901 | 9/1997 | WIPO . | |

OTHER PUBLICATIONS

International Search Report of Dec. 3, 1998.

*Primary Examiner*—Rachel Gorr
*Attorney, Agent, or Firm*—Donald F. Haas

[57] ABSTRACT

The present invention relates to a structural adhesive compositions comprising a polyurethane which is obtainable by reacting a polyisocyanate having a functionality in the range of from 2 to 3 and a hydrogenated polybutadiene polyol having a functionality in the range from 1.5 to 2.5 and a 1,2 vinyl content prior to hydrogenation of from 30 to 70% by weight, and wherein the NCO:OH molar ratio is in the range from more than 1.05 up to 1.6.

20 Claims, No Drawings

STRUCTURAL ADHESIVES

FIELD OF THE INVENTION

The present invention relates to a structural adhesive comprising a polyurethane, and to a multi-component system, in particular a two-component system for preparing such structural adhesive. The present invention further relates to articles containing the structural adhesive.

BACKGROUND OF THE INVENTION

It is known from U.S. Pat. No. 3,437,622 that thermoset reaction products of polyols with aromatic polyisocyanates compounded with tackifying resins and plasticizers can be used for high-temperature-resistant masking tapes.

European patent application publication No. 0 709 416 describes pressure sensitive adhesives and laminating adhesives which contain thermoset polyurethanes. In one embodiment the polyurethane is prepared from a polyisocyanate having a functionality of from 2.2 to 10 and a mixture of a hydrogenated polydiene mono-ol and a hydrogenated polydiene diol. According to another embodiment the polyurethane is prepared from a hydrogenated polydiene diol and a polyisocyanate having a functionality of from 2.2 to 10, wherein the NCO:OH molar ratio is between 0.3:1 and 0.7:1.

U.S. Pat. No. 4,820,368 describes a thermally stable reactive hot melt urethane adhesive composition having a thermoplastic polymer, a compatible curing urethane polyalkylene polyol pre-polymer, and a tackifying agent. The polyalkylene polyol is preferably a hydrogenated polybutadiene diol, either having a 1,2 vinyl content before hydrogenation of 0 to 20% by weight or 80 to 100% by weight. The NCO:OH ratio in the urethane pre-polymer is well above 2 in all examples.

The structural adhesive of the present invention typically does not contain a thermoplastic polymer. A different hydrogenated polybutadiene polyol is used and the NCO:OH ratio is lower, thus leading to a more flexible structural adhesive which is easier to process.

EP-A-0 504 436 describes a two-part polyurethane adhesive. The polyurethane preferably has a NCO:OH ratio of 2 to 10. The two component system consists of a main component comprising a hydroxyl-terminated saturated polyester resin or a polyester urethane rubber and a curing agent comprising a urethane pre-polymer having an active isocyanate group which is prepared by reacting a hydrogenated hydroxyl terminated polybutadiene with an excess amount of a polyisocyanate. The hydroxyl-terminated polybutadiene can have a 1,2 vinyl content of 0–100%. In the examples, a hydroxyl-terminated polybutadiene having a 1,2 vinyl content prior to hydrogenation of about 20% by weight is used.

EP-A-0 522 658 describes functionalised block copolymers cured with isocyanates, for example for use in coatings. The functionalised block copolymers are typically functionalised, hydrogenated styrene-butadienestyrene block copolymers. In comparative example 4, a hydroxy functional hydrogenated polybutadiene, having a 1,2 vinyl content prior to hydrogenation of 84% by weight, is reacted with triisocyanates at a NCO:OH ratio of 1.25 and 1.5 and formed into a coating.

However, there is a need for fully crosslinked structural adhesives which can be used at high temperatures. Further, there is a need for structural adhesives having better cohesion properties and being less brittle whilst exhibiting enhanced stability. In particular, there is a need for flexible structural adhesives which can adhere to a variety of substrates, including polyolefins.

Surprisingly, polyurethane-based structural adhesives have now been found which solve one or more problems encountered with known structural adhesives. In particular, polyurethane-based structural adhesives have been found which have better tack and cohesive properties, can adhere to a variety of substrates including polyolefins, and can be used up to high temperatures. It has now been found possible to provide such polyurethane-based structural adhesives by using a polyisocyanate and a polydiene polyol in the preparation of polyurethane.

SUMMARY OF THE INVENTION

According to a first aspect, the present invention relates to a structural adhesive composition comprising a polyurethane which is obtainable by reacting a polyisocyanate having a functionality in the range of from 2 to 3 and a hydrogenated polybutadiene polyol having a functionality in the range from 1.5 to 2.5 and a 1,2 vinyl content prior to hydrogenation of from 30 to 70% by weight, and wherein the NCO:OH molar ratio is in the range from more than 1.05 up to 1.6.

The functionality is defined as the number of functional groups, that is hydroxy groups, per molecule. The functionality F can be determined by NMR or chemical titration techniques.

DETAILED DESCRIPTION OF THE INVENTION

If the functionality of the polyol is less than 1.5, the cohesive properties of the structural adhesive are too low. If the functionality of the polyol is more than 2.5, the structural adhesive may be too highly crosslinked and lack rubbery behaviour. Preferably, the functionality of the polyol ranges from 1.7 to 2.4. The desired flexibility and cohesion of the structural adhesive can be influenced by selecting a functionality for the polyol within the above ranges.

Similarly, if the functionality of the polyisocyanate is less than 2, the cohesion is not sufficient. If the functionality of the polyisocyanate is more than 3, the polyurethane structural adhesive becomes too brittle.

Preferably, the hydrogenated polybutadiene polyol is a hydrogenated polybutadiene diol typically having a functionality from 1.5 to 2.0, preferably from 1.7 to 2.0, and more preferably having a functionality in the range from 1.85 to 2.0. The hydrogenated polybutadiene diol typically contains hydroxyl groups at the terminal ends of the polymer. Thus, the hydrogenated polybutadiene diol is typically a hydroxyl-terminated hydrogenated polybutadiene.

The polybutadiene diol preferably has a number average molecular weight in the range from 500 to 20000, more preferably in the range from 1000 to 10000, even more preferably in the range from 2000 to 6000 g/mol. The number average molecular weight is determined by Gel Permeation Chromatography (GPC) calibrated with polybutadiene standards having known number average molecular weights. The solvent for the GPC analyses is tetrahydrofuran.

The hydrogenated polybutadiene polyol has a 1,2-addition between 30% and 70% to minimise viscosity and subsequent crystallisation. More preferably, the 1,2 vinyl content in the hydrogenated polybutadiene polyol is between 40% and 60%. The polydiene microstructures are typically determined by $^{13}$C nuclear magnetic resonance (NMR) in chloroform.

The polybutadiene diols preferably have hydroxyl equivalent weights in the range of from 250 to 10,000, more preferably in the range of from 500 to 7,500.

The polybutadiene diol used in this invention may be prepared anionically such as described in U.S. Pat. specification Nos. 5,376,745, 5,391,663, 5,393,843, 5,405,911, and 5,416,168, which are herein incorporated by reference.

Polymerization of the polybutadiene diol commences with a monolithium or dilithium initiator which builds a living polymer backbone at each lithium site. The anionic polymerization is carried out in solution in an organic solvent, typically a hydrocarbon like hexane, cyclohexane or benzene, although polar solvents such as tetrahydrofuran can also be used. The molar ratio of initiator to monomer determines the molecular weight of the polymer.

The anionic polymerization of butadiene in a hydrocarbon solvent like cyclohexane is typically controlled with structure modifiers such as diethylether or glyme (1,2-diethoxyethane) to obtain the desired amount of 1,2-addition. The optimum balance between low viscosity and high solubility in a hydrogenated polybutadiene polymer occurs at a 60/40 ratio of 1,4-butadiene/1,2-butadiene. This butadiene microstructure may e.g. be achieved during polymerization at 50° C. in cyclohexane containing about 6% by volume of diethylether or about 1000 ppm of glyme.

Anionic polymerization is terminated by addition of a functionalizing agent like those in U.S. Pat. specification Nos. 5,391,637, 5,393,843, and 5,418,296, which are herein incorporated by reference, but preferably the living polymer is capped with ethylene oxide prior to termination. Thus, if a di-lithium initiator is used, each mole of living polymer is preferably capped with two moles of ethylene oxide and terminated with two moles of methanol to yield the desired polybutadiene diol.

The polybutadiene diol can also be made using a monolithium initiator which contains a hydroxyl group which has been blocked as the silyl ether (as in U.S. Pat. specification Nos. 5,376,745 and 5,416,168). A suitable initiator is hydroxypropyl-lithium in which the hydroxyl group is blocked as the trimethylsilyl ether. This mono-lithium initiator can be used to polymerize butadiene in hydrocarbon or polar solvent. Each mole of living polymer is then capped with one mole of ethylene oxide and terminated with one mole of methanol to yield the mono-hydroxy polydiene polymer. The silyl ether is then removed by acid catalyzed cleavage in the presence of water yielding the desired polybutadiene diol.

The polybutadiene polyol is preferably hydrogenated such that at least 90%, more preferably at least 95%, of the carbon to carbon double bonds in the polyol is saturated. Hydrogenation of these polymers may be carried out by a variety of well established processes including hydrogenation in the presence of such catalysts as Raney Nickel, noble metals such as platinum and palladium, soluble transition metal catalysts and titanium catalysts as in U.S. Pat. specification No. 5,039,755 which is herein incorporated by reference. A particularly preferred catalyst is a mixture of nickel 2-ethylhexanoate and triethylaluminum.

A variety of polyisocyanates can be used to prepare the polyurethane structural adhesive. However, the polyisocyanates must be capable of forming a three dimensional network with the polyol. Preferably, the isocyanate functionality of the polyisocyanate is in the range of from 2.1 to 2.9, more preferably in the range of from 2.5 to 2.9. Preferably, the polyisocyanate is polymeric MDI (polymeric diphenylmethane diisocyanate) or a hydrogenated version thereof, such as HMDI.

The polyisocyanate and the polybutadiene polyol are typically mixed and reacted to form an isocyanate-terminated (network) polymer. The isocyanate-terminated polymer is typically a gel.

The respective amounts of polyisocyanate and the polyol are typically chosen such that there is a small excess of isocyanate (NCO) groups. The molar ratio NCO:OH is preferably from 1.1 to 1.3.

The polyurethane composition can be formed by curing into a mould for several hours and then postcuring the product for a period of time at elevated temperature, typically for 0.5 to 24 hours at a temperature of at least 50° C., preferably at a temperature in the range from 60° C. to 150° C., for example above 110° C. for at least 2 hours or at 80° C. for 7 hours. Preferably, however, the polyurethane composition is formed by mixing the polyisocyanate and the polyol and curing the mixture at ambient temperature. According to one embodiment the mixture can be cured outdoors. Due to the small excess of isocyanate, water additionally reacts with the isocyanate to form amines which crosslink with other isocyanate groups to form additional crosslinks (postcuring).

The essential components of the structural adhesives of this invention are the polyisocyanate and the polybutadiene polyol polymers. However, the adhesives can contain many other ingredients as follows.

Aromatic polyisocyanates are usually sufficient reactive that they will cure the polybutadiene polyol polymer readily at ambient temperature without the need for a catalyst. However, aliphatic polyisocyanates are known to be less reactive and so a catalyst is often added to the adhesive formulation to increase the rate of reaction. Many catalysts are known in the literature to enhance isocyanate/hydroxyl reactions. A particularly preferred catalyst is dibutyl tin dilaurate (DABCO® T-12 from Air Products). Catalysts are typically used at concentrations of 0.05 to 0.5% w, based on polyol/polyisocyanate reactive ingredients.

The structural adhesive of the present invention may optionally comprise a tackifying resin.

Tackifying (tackifier) resins are known to those skilled in the art and have for example been described in detail in the Handbook of Pressure Sensitive Adhesive Technology, $2^{nd}$ ed., 1989, edited by Donatas Satas, pages 527 to 544. Typically, the tackifying resin is selected from aliphatic oligomers derived from $C_2$–$C_{10}$ aliphatic mono-ene or diene monomers, preferably derived from $C_4$–$C_6$ aliphatic monomers, rosin esters, hydrogenated rosins, poly(terpene) resins, alpha-pinene resins, beta-pinene resins, hydrocarbon resins of petroleum origin, or phenolic resins. Preferably, the tackifying resin is compatible with the soft phase of the polyurethane, that is the part of the polyurethane molecule derived from the polybutadiene polyol. Hydrogenated hydrocarbon resins or aliphatic oligomers are particularly preferred. An example of a commercially available hydrogenated aliphatic oligomer resin is REGALITE R91 (REGALITE is a trademark), marketed by Hercules. Other suitable tackifying resins are REGALITE R101, R125 and S260, ESCOREZ 1310 and 5380 (ESCOREZ is a trademark), WINGTACK 95 (WINGTACK is a trademark), FORAL 85 and 105 (FORAL is a trademark), PICCOLYTE A115, S115, and S10 (PICCOLYTE is a trademark) and PICCOTAC 95E (PICCOTAC is a trademark).

The tackifying resin, if present, is typically used in amounts up to 400 parts by weight (pbw) per 100 parts of polyurethane, preferably in an amount of from 10 to 300 pbw, more preferably from 50 to 200 pbw.

If desired, the structural adhesive of the present invention further comprises a plasticizer. Plasticizers are known to those skilled in the art and have for example been described in detail in the Handbook of Pressure Sensitive Adhesive Technology referred to herein before. Suitable plasticizers are those which are compatible with the tackifying resin and the diene blocks of the polyurethane. Examples of suitable plasticizers include mineral oils, animal or vegetable oils or low molecular weight liquid polyolefins, that is a weight average molecular weight of up to 5,000, preferably up to 2,000. Preferred plasticizers substantially do not contain olefinic unsaturation, that is at least 95% of the plasticizer is hydrogenated. Examples of suitable plasticizers include naphthenic oils marketed as SHELLFLEX 371 and 451, CATENEX 956 and TUFFLO 6204, paraffinic oils such as TUFFLO 6056, polybutylenes such as HYVIS 200, NAPVIS 30 and D-10, liquid resins such as REGALEZ 1018 and other oils such as ONDINA 68 and V-OIL 7047 (SHELLFLEX, CATENEX, TUFFLO, HYVIS, NAPVIS, REGALEZ, ONDINA, and V-OIL are trademarks). Primarily for economic reasons, especially preferred plasticizers are hydrogenated mineral oils.

The plasticizer, if present, is typically used in amounts of up to 150 pbw per 100 pbw of polyurethane, preferably of from 10 to 100 pbw, more preferably of from 25 to 75 pbw.

Apart from any tackifying resin and any plasticizer, other additives such as antioxidants, UV stabilisers, fillers, and flame retarders may be present, depending on the specific conditions under which the structural adhesive composition is to be used. It belongs to the skill of the skilled person in this field to select any appropriate additional additives and the desired amount to be added to the structural adhesive composition of this invention.

According to a further embodiment, the present invention relates to a structural adhesive as described herein, wherein part of the hydrogenated polybutadiene polyol has been replaced by a polymeric polyol, having a functionality in the range of from 1.5 to 2.5 and a number average molecular weight of 500 to 10,000, selected from the group consisting of polyester polyol, polyether polyol, hydroxy-terminated polycarbonates, and hydroxy-terminated copolymers of dialkyl siloxane and alkylene oxides. Preferably, the polymeric polyol comprises not more than 95% wt. based on the total amount of polyols, more preferably from 10 to 90% wt, even more preferably from 25 to 80% wt.

According to a second aspect, the present invention relates to a multi-component system, in particular a two-component system, for preparing structural adhesives of the invention. The multi(two-) component system comprises a first component comprising a hydrogenated polybutadiene polyol as disclosed herein having a functionality in the range of from 1.5 to 2.5, and a 1,2 vinyl content prior to hydrogenation of from 30 to 70% by weight and a second component comprising a polyisocyanate having a functionality in the range of 2 to 3, wherein the first and second component are present in an amount such that the NCO:OH molar ratio is in the range from more than 1.05 up to 1.6, and preferably in the range from 1.1 to 1.3.

Preferably, at least the second component, more preferably both the first and the second component contain a hydrocarbon solvent to reduce the viscosity and to prevent reaction of the polyisocyanate with water prior to admixture with the first component to form the structural adhesive.

Examples of suitable solvents include aliphatic and aromatic hydrocarbon solvents. Preferred aliphatic solvents are hexane, naphtha or mineral spirits. Preferred aromatic solvents are toluene and xylene. Oxygenated solvents may also be used, such as ethers, esters and ketones but alcohols must be avoided since they will interfere with the reaction of the polyisocyanate and the polydiene polyol polymer. The solvents are typically urethane grade, low water content solvents. The amount of solvent in the formulation will depend on the viscosity requirements and on the particular polymers in the formulation. If the adhesive will be sprayed at room temperature as a multi-component product, solvent could be as much as 50% w of the formulation.

If desired, part of the hydrogenated polybutadiene polyols required to form the structural adhesive of the invention may be admixed (reacted) with the polyisocyanate to form a polyurethane prepolymer. The second component then typically comprises the polyurethane prepolymer, polyisocyanate and any solvent.

According to yet another embodiment, a three-component system is provided comprising a first component comprising the hydrogenated polybutadiene polyol, a second component comprising the polyisocyanate and a third component comprising a polyurethane-prepolymer.

According to yet another embodiment the present invention relates to a multi-component system for preparing structural adhesives as described herein, comprising (i) a first component comprising a polymeric polyol, having a functionality in the range of from 1.5 to 2.5 and a number average molecular weight of 500 to 10,000, selected from the group consisting of polyester polyol, polyether polyol, hydroxy-terminated copolymers of dialkyl siloxane and alkylene oxides.

(ii) a second component comprising an isocyanate-terminated prepolymer obtainable by reacting a hydrogenated polybutadiene polyol having a functionality in the range of from 1.5 to 2.5 and a 1,2 vinyl content prior to hydrogenation of from 30 to 70% by weight with an excess of a polyisocyanate having a functionality in the range of from 2 to 3, wherein the first and second component are present in an amount such that the NCO:OH ratio is in the range from more than 1.05 up to 1.6 and preferably from 1.1 to 1.3.

According to a third aspect, the present invention relates to a process for preparing a structural adhesive which comprises mixing, and reacting a mixture of a first and a second component, wherein the first component comprises a hydrogenated polybutadiene polyol having a functionality in the range of from 1.5 to 2.5 and a 1,2 vinyl content prior to hydrogenation of from 30 to 70% by weight and the second component comprises a polyisocyanate having a functionality in the range of from 2 to 3, or wherein the first component comprises a polymeric polyol, having a functionality in the range of from 1.5 to 2.5 and a number average molecular weight of 500 to 10,000, selected from the group consisting of a polyester polyol, polyether polyol, hydroxy-terminated copolymers of dialkyl siloxane and alkylene oxides, and the second component comprises an isocyanate-terminated prepolymer obtainable by reacting a hydrogenated polybutadiene polyol having a functionality in the range of from 1.5 to 2.5 and a 1,2 vinyl content prior to hdyrogenation of from 30 to 70% by weight with an excess of a polyisocyanate having a functionality in the range of from 2 to 3, wherein the mixture of the first and second component are present in an amount such that the NCO:OH molar ratio is in the range from more than 1.05 up to 1.6.

According to a fourth aspect, the present invention relates to articles containing the structural adhesive as described herein. The structural adhesive of the present invention is particularly suitable for use in applications where strong adhesion to plastics, in particular polyolefins, is needed, i.e. in construction, mounting, automotive applications and footwear. The structural adhesive of the present invention may be used as a laminating adhesive, e.g. adhering a base polyolefin material and a covering material, e.g. a sheet, film or foam of polyvinyl choloride (PVC), polyamide or polyurethane.

The invention will now be further illustrated by means of the following Example.

EXAMPLE

A structural adhesive composition was prepared by mixing CARADATE® 30 polymeric MDI having an isocyanate functionality of 2.7, and KRATON LIQUID® L-2203 hydrogenated polybutadiene diol, having a functionality of 1.92, a 1,2 vinyl content prior to hydrogenation of 54% by weight, and a hydroxyl equivalent weight of 1720. The mixture had a [NCO]/[OH] ratio of 1.1. The mixture (a warm melt) was used to glue a variety of substrates together and the mixture (structural adhesive) was (moisture) cured at 60° C. for one hour to form a (cured) structural adhesive bond. The glued section covered 8 $cm^2$ and had a thickness of approximately 200 μm. Adhesive properties were determined by the lap shear test (ASTM 106). The lap shear test results are set out in Table 1. As can be seen from Table, the structural adhesive of the present invention are capable of forming very strong adhesive bonds between a variety of substrates, including polyolefins.

TABLE 1

| Experiment No. | Substrates glued together | Lap shear test |
| --- | --- | --- |
| 1 | PA6/PA6 | 62 N/cm$^2$ |
| 2 | PPE/PPE | 147 N/cm$^2$ |
| 3 | ABS 365/ABS 365 | 61 N/cm$^2$ |
| 4 | PET/PET | 116 N/cm$^2$ |
| 5 | PP/PP | 50 N/cm$^2$ |
| 6 | PE/PE | 40 N/cm$^2$ |
| 7 | PMA/PMA | 85 N/cm$^2$ |
| 8 | PK/PK | 84 N/cm$^2$ |
| 9 | glass/glass | 80 N/cm$^2$ |
| 10 | stainless steel/stainless steel | 100 N/cm$^2$ |

PA6 = ULTAMID ® polyamide
ABS 365 = CYCOLAC ® acrylonitrile butadiene styrene
PPE = NORYL ® N 110 polyphenylene ether
PET = CARIPAK ® P82 polyethyleneterephtalate
PE = ADFLEX ® LD 2500 FA polyethylene
PP = polypropylene
PK = CARILON ® DP R1000 polyketone
PMA = OROGLAS ® polymethylacrylate

I claim:

1. A structural adhesive composition comprising a polyurethane which is obtained by reacting a polyisocyanate having an NCO functionality greater than 2 and less than or equal to 3 and a hydrogenated polybutadiene polyol having an OH functionality in the range from 1.5 to 2.5 and a 1,2 vinyl content prior to hydrogenation of from 30 to 70% by weight, wherein the NCO:OH molar ratio is in the range from more than 1.05 up to 1.6.

2. The structural adhesive as claimed in claim 1 wherein the functionality of the polyol ranges from 1.7 to 2.4.

3. The structural adhesive as claimed in claim 1 wherein the functionality of the polyisocyanate ranges from 2.1 to 2.9.

4. The structural adhesive as claimed in claim 1 wherein the functionality of the polyisocyanate ranges from 2.5 to 2.9.

5. The structural adhesive as claimed in claim 1 wherein the hydrogenated polybutadiene polyol is a hydrogenated polybutadiene diol.

6. The structural adhesive as claimed in claim 5 wherein the polybutadiene diol has a number average molecular weight in the range from 500 to 20000.

7. The structural adhesive as claimed in claim 1 wherein the polyisocyanate is a polymeric MDI or a hydrogenated polymeric MDI.

8. The structural adhesive as claimed in claim 1 which also comprises a polymeric polyol having a functionality in the range of from 1.5 to 2.5 and a number average molecular weight of 500 to 10,000, wherein the polymeric polyol is selected from the group consisting of polyester polyol, polyether polyol, hydroxy-terminated polycarbonates, and hydroxy-terminated copolymers of dialkyl siloxane and alkylene oxides.

9. The structural adhesive as claimed in claim 1 further comprising one or more components selected from a catalyst, a tackifying resin, a plasticizer, an antioxidant, and a filler.

10. A multi-component system for preparing structural adhesives comprising:
   (i) a first component comprising a hydrogenated polybutadiene polyol having an OH functionality in the range of from 1.5 to 2.5 and a 1,2 vinyl content prior to hydrogenation of from 30 to 70% by weight, and
   (ii) a second component comprising a polyisocyanate having an NCO functionality greater than 2 and less than or equal to 3,
   wherein the first and second component are present in an amount such that the NCO:OH molar ratio is in the range from more than 1.05 up to 1.6.

11. The multi-component system as claimed in claim 10 wherein the first and second component contain a hydrocarbon solvent.

12. A multi-component system for preparing structural adhesives comprising:
   (i) a first component comprising a polymeric polyol having an OH functionality in the range of from 1.5 to 2.5 and a number average molecular weight of 500 to 10,000;
   (ii) a second component comprising an isocyanate-terminated prepolymer obtained by reacting a hydrogenated polybutadiene polyol having an OH functionality in the range of from 1.5 to 2.5 and a 1,2 vinyl content prior to hydrogenation of from 30 to 70% by weight with an excess of a polyisocyanate having an NCO functionality greater than 2 and less than or equal to 3,
   wherein the first and second component are present in an amount such that the NCO:OH molar ratio is in the range from more than 1.05 up to 1.6.

13. A process for preparing a structural adhesive which comprises mixing and reacting a mixture of a first and a second component, wherein the first component comprises a hydrogenated polybutadiene polyol having an OH functionality in the range of from 1.5 to 2.5 and a 1,2 vinyl content prior to hydrogenation of from 30 to 70% by weight, and the second component comprises a polyisocyanate having an NCO functionality greater than 2 and less than or equal to 3, wherein the first and second component are present in an amount such that the NCO:OH molar ratio is in the range from more than 1.05 up to 1.6.

14. A process for preparing a structural adhesive which comprises mixing and reacting a mixture of a first and a second component, wherein the first component comprises a hydrogenated polybutadiene polyol having a functionality in the range of from 1.5 to 2.5 and a 1,2 vinyl content prior to hydrogenation of from 30 to 70% by weight, wherein the first component comprises a polymeric polyol having a functionality in the range of from 1.5 to 2.5 and a number average molecular weight of 500 to 10,000, and selected from the group consisting of polyester polyol, polyether polyol, hydroxy-terminated copolymers of dialkyl siloxane and alkylene oxides, and the second component comprises an isocyanate-terminated prepolymer obtainable by reacting a hydrogenated polybutadiene polyol having a functionality in the range of from 1.5 to 2.5 and a 1,2 vinyl content prior to hydrogenation of from 30 to 70% by weight with an excess of a polyisocyanate having a functionality in the range of from 2 to 3, wherein the mixture the first and second component are present in an amount such that the NCO:OH molar ratio is in the range from more than 1.05 up to 1.6.

15. The multi-component system as claimed in claim 12, wherein the polymeric polyol is selected from the group consisting of a polyester polyol, polyether polyol, hydroxy-terminated copolymer of dialkyl siloxane, alkylene oxides, and combinations thereof.

16. A structural adhesive composition comprising:
a polyurethane which is obtained by reacting a polyisocyanate having an NCO functionality greater than 2 and less than or equal to 3, and a hydrogenated polybutadiene polyol having an OH functionality in the range from 1.5 to 2.5 and a 1,2 vinyl content prior to hydrogenation of from 30 to 70% by weight, wherein the NCO:OH molar ratio is in the range from more than 1.05 up to 1.6; and a polymeric polyol having an OH functionality in the range of from 1.5 to 2.5 and a number average molecular weight of 500 to 10,000, wherein the polymeric polyol is selected from the group consisting of polyester polyol, polyether polyol, hydroxy-terminated polycarbonates, and hydroxy-terminated copolymers of dialkyl siloxane and alkylene oxides.

17. The structural adhesive as claimed in claim 16, wherein the functionality of the polyisocyanate ranges from 2.1 to 2.9.

18. The structural adhesive as claimed in claim 16, wherein the functionality of the polyisocyanate ranges from 2.5 to 2.9.

19. The structural adhesive as claimed in claim 16, wherein the hydrogenated polybutadiene polyol is a hydrogenated polybutadiene diol.

20. The structural adhesive as claimed in claim 16, further comprising one or more components selected from a catalyst, a tackifying resin, a plasticizer, an antioxidant, and a filler.

* * * * *